Figure 1:
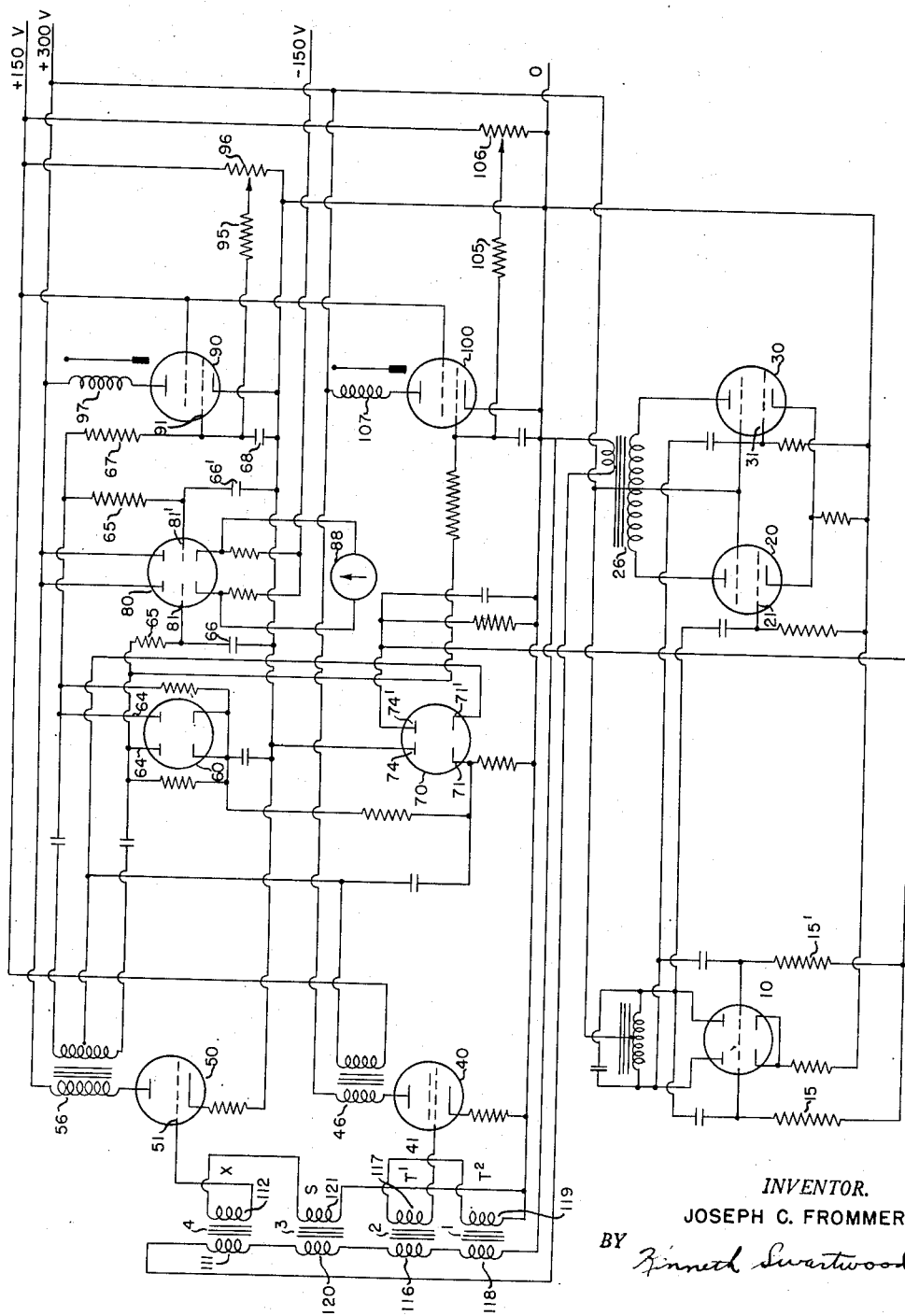

INVENTOR.
JOSEPH C. FROMMER

April 20, 1954  J. C. FROMMER  2,676,298
DEVICE FOR MEASURING THE THICKNESS OF SHEET MATERIAL
Filed Dec. 22, 1950

3 Sheets-Sheet 2

ROLLER (BEING USED AS REFERENCE PLATE)

INVENTOR.
JOSEPH C. FROMMER
BY Kenneth Swartwood

April 20, 1954  J. C. FROMMER  2,676,298
DEVICE FOR MEASURING THE THICKNESS OF SHEET MATERIAL
Filed Dec. 22, 1950                             3 Sheets-Sheet 3

INVENTOR.
JOSEPH C. FROMMER
BY Kenneth Swartwood
ATTORNEY

Patented Apr. 20, 1954

2,676,298

UNITED STATES PATENT OFFICE 2,676,298

DEVICE FOR MEASURING THE THICKNESS OF SHEET MATERIAL

Joseph C. Frommer, Cincinnati, Ohio, assignor to Electric Eye Equipment Company, Danville, Ill., a corporation of Delaware Application December 22, 1950, Serial No. 202,383

5 Claims. (Cl. 324—34)

This invention relates to an apparatus for the detection of the thickness of materials in which the material to be tested is brought between a gaging head and a reference plate so that its thickness will influence the distance between them. The gaging head contains electrical means sensitive to its distance from the reference plate. The output of these means is therefore indicative of the thickness of the material. This output can be amplified and used to indicate the thickness or to actuate control mechanism in accordance with the thickness.

When high accuracy of such a device is required, then it is customary to provide a second gaging head and a second reference plate, keeping the distance between them at the value corresponding to material of desired thickness and to connect the output of the first gaging head in series with the second gaging head. Then a small percentage of change in the thickness to be measured will cause a substantial percentage of change in the resulting output, and slight changes in amplification will have a negligible effect on indication or action of the device. The device can then be calibrated so that a certain deflection on an instrument corresponds to a certain deviation of the tested thickness from a standard thickness, the direction of the deviation being indicative of whether the thickness is below or above the standard. Similarly, one relay may be energized if the thickness exceeds the standard by the specified amount and another if the thickness is short of the standard by the same or by another amount.

If, however, it is desired to detect the variation of thickness from one certain standard value in one case, and from some other standard value in some other case, then the calibration, giving deviation from standard as a function of meter deflection, valid for the first case will ordinarily not be true for the second case.

Let us assume, for instance, that variations of the electrical capacitance between the reference plate and a surface on the gaging head is being used to detect their distance from each other.

The formula for this capacitance is $$C = K \frac{F}{T}$$

where C is the capacitance in micro-microfarads, K is the constant, T is the distance between said surface and the reference plate and F is the area of said surface on the gaging head.

The variation of this capacitance for an infinitesimal variation $dT$ will then be:

$$\frac{dC}{dT} = K \frac{F}{T^2}$$

Thus, if we increase the standard distance to twice its original value, the indication of the instrument would decrease to one-fourth of its indication for the same deviation at the former standard thickness.

A similar simple formula might be written for the case that the variation of the self inductance or of the mutual inductance of a coil, with the variation of its distance from a ferromagnetic reference plate is being used. But in this latter case, eddy currents, hysteresis losses and stray flux make the real relationship substantially different from the one calculated from a first approximation. Actual tests have shown that increase of the distance between the laminated E-shaped iron core of a certain transformer and a cast steel plate from .050″ to .100″ caused the mutual inductance between the two windings of the transformer to drop from about 39 millihenries to about 33 millihenries, and variation of inductance to drop from 228 microhenries per mil to 84 microhenries per mil.

It is seen that whereas the usual method of "bucking" the output of the gaging head against that of a standard head is highly successful as long as the standard head is kept in one and the same position, it requires an entire recalibration each time the standard distance has to be changed.

It is an object of the present invention to provide a device of the type described in which calibration is independent of the standard distance between gaging head and reference plate, within a considerable range.

It is a further object of the invention to provide an improved device to detect the thickness of nonmagnetic materials.

Further object and advantages of the invention may be apparent in connection with its detailed description to be given herebelow.

To obtain an output which is indicative of the difference between the distance between the standard head and its reference plate (to be called "standard gap," as well as the distance between the gaging head and its reference plate is to be called "test-gap") I provide a signal derived from the difference of two gaps, the average value of these two gaps being held equal to or closely related to the value of the standard gap, the difference between them however being kept independent from the value of the standard gap. I vary the sensitivity of the heads or of the amplifiers connected to them automatically till the output from this constant gap-difference reaches a certain value. Then, if the standard gap is being increased in order to test thicker material, the output derived from difference between the test gap and the standard gap will be increased in the same proportion in which the sensitivity of the heads would decrease due to the increased standard gap, and the calibration of the device will stay unchanged.

The constant gap difference necessary for this purpose may be obtained in various ways. We may provide in addition to the standard head and the test-head, two additional heads, and link them mechanically with the standard head in such a manner that their gaps vary by the same amount by which the standard gap is being varied, keeping the gap of one of them by a certain small amount above the standard gap and and keeping the gap of the other below the standard gap by the same amount.

One of the two additional heads may be omitted by using the signal of one such additional head bucked by the signal of the standard head proper, but the former way allows symmetrical splitting of the reference gap-difference toward both sides of the standard gap and allows to match the two additional heads with each other independently from the matching necessary between the standard head and the test-head.

Another way of obtaining the reference gap-difference is to vary the standard gap or the test gap periodically by a given amount. Then one can keep the sensitivity of the device automatically at such a level that the alternations of the output occurring at the rate of said periodical variations stay constant independently of the average position of the periodically varied gap or the actual value of the other gap.

Other ways of obtaining the reference gap difference may be devised within the scope of my invention. Whichever way this difference is provided, it can serve as a ready base of reference for the difference between the test-gap and the standard gap and will make the functioning of the device independent of all factors affecting the output from the constant gap difference in the same way as the output from the difference between the test-gap and the standard gap.

Figure 2:
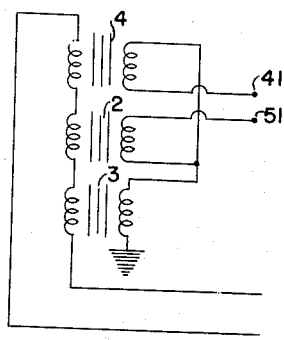
Figure 4:
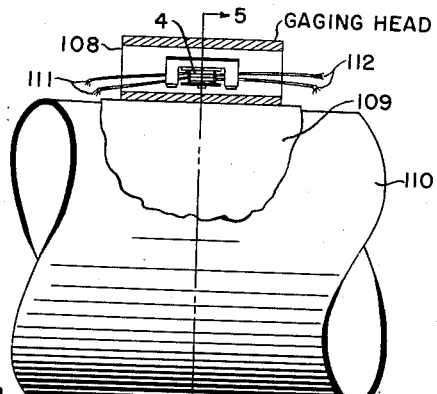
Figure 3:
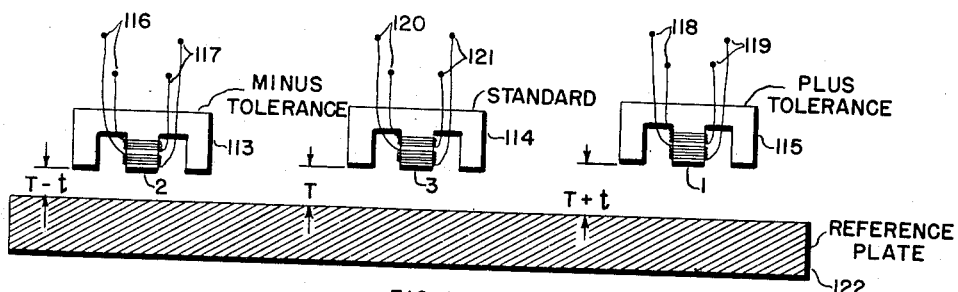
Figure 5:
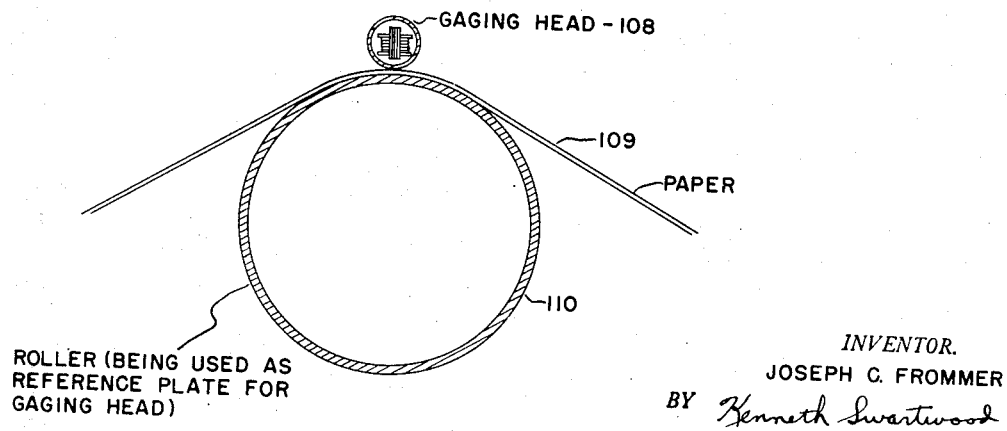
Figure 6:
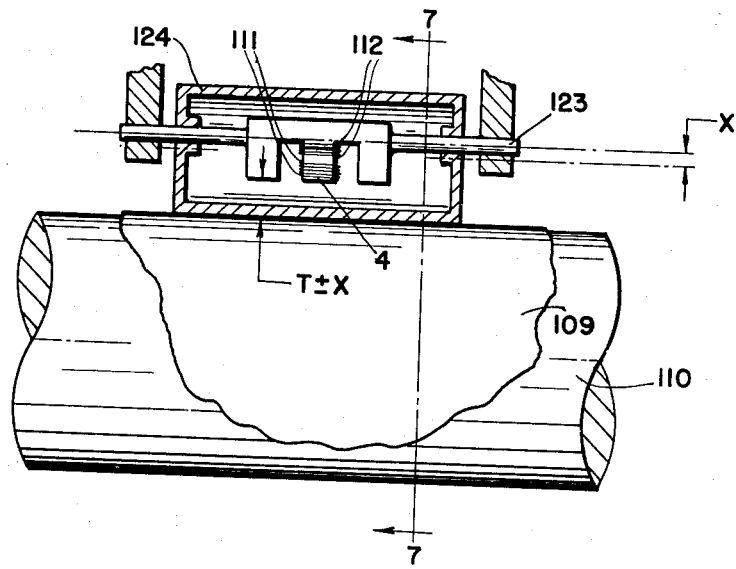
Figure 7:
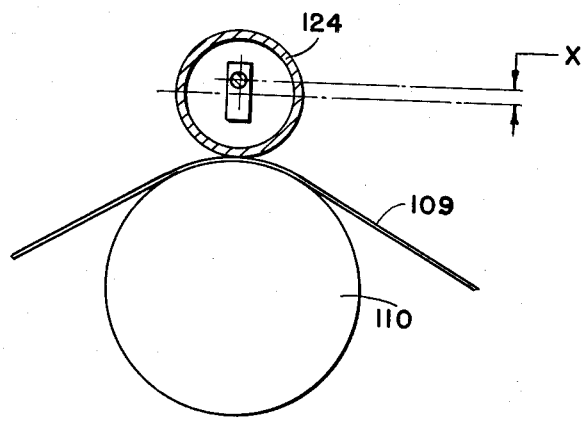

My invention can be further understood by reference to the drawings in which Figure 1 is a diagrammatic drawing of the electronic circuit used for controlling or indicating the thickness of the material being measured. Figure 2 illustrates a modification of the input portion of the circuit. Figure 3 illustrates the standard gauging head and the two "tolerance" gauging heads. Figure 4 shows the exploring head in position for measuring the thickness of a material on a drum. Figure 5 is a cross-sectional view of Figure 4 along the line 5—5. Figure 6 represents a modification of Figure 4 illustrating an exploring head on an eccentric carriage. Figure 7 is a cross-sectional view of Figure 6 along the line 7—7.

In Fig. 1 tube 10 is a conventional generator of alternating voltage, which generates an alternating voltage of say 400 cycles per second. It will be noted that its grids are connected across resistors 15, 15' to plate 74' of detector tube 70, the function of which will be described later. The oscillation generated in tube 10 is impressed on grids 21, 31 of amplifier tubes 20 and 30. These tubes are preferably beam power vacuum amplifiers e. g., type 6AQ5. These tubes are connected in a conventional push pull circuit and feed an alternating voltage of say 400 cycles per second to the transformer 26. The secondary winding of transformer 26 feeds the primaries 111, 120, 116 and 118 of the four transformers 1, 2, 3, 4 which are all connected in series with each other. These transformers have each a primary and a secondary winding, both wound around an iron core. This iron core is situated opposite an iron plate. Transformer 3 is the sensitive element of the standard gaging head, 4 is the one of the test gaging head and 1 and 2 are the ones of the two auxiliary gaging heads. As the four primaries are all connected in series with each other, and due to the fact that all four primaries have the same number of turns, the 400 cycles per second magnetomotive force generated in all four of these transformers will be exactly equal. The magnetic flux generated by this magnetomotive force depends however not only on the magnetomotive force in the primaries, but also on the magnetic reluctance of the path which links the primary with the secondary. This reluctance is substantially dependent on the air gap between the iron cores and the co-ordinated steel plates. Accordingly, the 400 cycles per second flux and the electromotive force generated in the secondaries will depend on the distance between iron core and plate and it is this dependence which is being used to indicate the distance between iron core and metal plate.

The secondaries 112, 121 of transformers 3 and 4 are connected in series with each other in such a phase relationship that the electromotive forces in these two secondaries tend to cancel out each other. If, therefore, the distance between iron core and steel plate of systems 3 and 4 are equal and all other factors are equally kept symmetrical, these two E. M. F's. will cancel each other out completely and no signal whatsoever will appear at the grid 51 of amplifier tube 50.

In a similar manner, the outputs of coils 117 and 119 of transformers 1 and 2 would cancel out each other, if the respective distances were exactly equal. It was pointed out, however, that systems 1 and 2 are kept constantly at different distances from each other and so the signal on grid 41 of tube 40 will never become zero. The signal from 1 and 2 is aplified by tube 40 and preferably is further amplified by means not shown and causes a correspondingdy amplified signal in the transformer 46 connected to its plate.

Similarly the signal obtained on grid 51 is amplified and appears in transformer 56. It will be noticed that the center tap of secondary of 56 is connected to one end of the secondary of 46. It is therefore being kept at alternating voltage depending in its phase on the phase of the voltage impressed to grid 41. Accordingly the two terminals of this secondary of 56 will assume voltages which are the sum of the secondary voltage in 46 and the respective half of the secondary voltage in 56. As these two halves are in opposite polarities, I obtain on one terminal substantially the difference and on the other terminal the sum of the respective secondary electromotive forces. Therefore, as long as the standard distance and exploring distance (3 and 4) are exactly equal, both ends of the secondary of 56 will be at the same alternating potential (because the alternating voltage in the two halves is now zero). But if the distance of the exploring system changes, then we obtain on one end a higher and on the other end a lower (400 cycles per second) E. M. F., according to whether the exploring distance is more or less than the standard distance. The alternating voltages obtained on these two terminals are impressed to plates 64 and 64' of twin diode 60. As long as these two alternating voltages are equal to each other, the rectified voltages on these two diode plates will stay equal to each other. But if one alternating voltage exceeds the other, the respective diode plate will become more negative. The voltage obtained on diode plates 64, 64' is filtered by resistors 65, 65' and capacitors 66 and 66' and applied to grids 81, 81' of twin amplifier 80. This twin triode amplifier (e. g., a type 12AU7 tube) is connected in the well known cathode follower circuit and causes the meter 88 to swing in one direction or the other according to which diode became more negative than the other.

If the device is used not only to indicate the amount of discrepancy between standard and unknown, but also to actuate some correcting mechanism, a tube 90 can be added having a relay 97 in its plate circuit and having its grid 91 connected across filter network 67, 68 to plate 64'. This grid is connected further across resistor 95 to the tap on a potentiometer 96. Accordingly the grid will assume a voltage depending on both the potential of the plate 64' and the position of the potentiometer 96. The relay will close or open when the voltage on this grid comes above or below a certain value. The value of voltage of 64' at which this occurs can be adjusted by potentiometer 96.

Relay 97 will act when plate 64' becomes more negative than the value corresponding to the setting of potentiometer 96. If one desires action not only for deviation in one direction, but also for deviation in the opposite direction, then one can add a tube 100, relay 107 to act in a similar manner for deviations which will make plate 64 more negative.

The system as described until now would indicate the direction of deviation, but the readings on the meter would be dependent not only on the value of deviation btween standard and unknown but also on how far the standard has been set from its plate. Indeed it is readily seen that if the airgap on the standard is set to .100", .001" deviation will cause a substantially lower E. M. F. than it would when the standard is being set to say .025" from its plate. To obtain readings which will give the true deviation between standard and unknown and give this reading independently from whether one is testing heavy material (with the standard set to say .100"), or like material with the standard set to say .025", the following system is used according to the invention: While plate 74 of diode 70 serves merely to give a convenient bias to the diode system 60, plate 74 is connected to grid resistors 15, 15' of oscillator tube 10. Cathode 71' is fed from the secondary of transformer 46. Anode 74' will assume a voltage which is negative with respect to the plus 150 volts (at which the secondary 46 is kept), by an amount depending on the alternating voltage existing in this secondary. Now if this alternating voltage causes in the diode system 71', 74' a voltage substantially higher than 150 volts then there will appear on the grid resistors 15, 15' a high negative bias, which tends to diminish the oscillations of the tube 10. If the oscillations of this tube diminish, then the output of tubes 20, 30 will diminish accordingly and the magnetomotive force in all four transformer primaries of transformers 1, 2, 3, 4 will diminish. If the magnetomotive force in 1, 2, diminishes, the signal in tube 40 diminishes, which in turn will diminish the A. C. impressed on system 71', 74', and the bias generated by this system will diminish. Thus, tube 10 will get less bias, its output will increase, and it will increase to such a point till the voltage rectified in system 71', 74' is just slightly above 150 volts. And if the standard is being set to a different distance, the same mechanism as just described will again work until the output of 71', 74' is again slightly above 150 volts. Thus by this means, the differential that exists between 1 and 2 will cause a constant output irrespective of whether the air gap on each of them is small or large. Now if the auxiliary coils 1, 2 are kept substantially at the same distance from their respective plates as is the standard coil with the one exception that one keeps a slight difference between them (e. g., if the standard is .025", we have 1 and 2 at .020" and .030" respectively. If the standard coil is at .100", we keep 1 and 2 at .095" and .105" respectively). Thus we always have an output of 150 volts for say .010" between auxiliaries. Now if the main amplifier system (tube 50 and transformer 56) is substantially identical with the auxiliary amplifier comprising the tube 40 and the transformer 46, then one also will get in the main amplifier 150 volts for a differential of .010" between standard coil and exploring coil, irrespective whether the standard is being set to .025" or .100" or whatever other value.

The above drawing gives only the most substantial portions of the circuit. In the actual circuit, I apply the automatic control from 74' not to the oscillator but to supercontrol amplifier tubes connected between this oscillator and the power tubes 20, 30. I also prefer to have one or more stages of amplification between tubes 40 and transformer 46 and tube 50 and transformer 56 respectively. I have reduced the drawing however to the simplest form for better understanding.

It also should be understood that I could use one of the main coils (3 or 4 to serve instead of say coil 1 of the auxiliary heads as shown on Fig. 2 in which case 1 is omitted. The use of core 1 is preferable in many cases because it makes the system more symmetrical with respect to deviations from the standard. However, for certain uses core 1 is not required and a cheaper and less cumbersome device is thereby obtained.

In Figure 4, gauging head 108, including coils 111 and 112 (also shown in Figure 1) and core 4 is in position to measure the thickness of paper 109 on drum 110.

Referring to Figure 3, a standard gauge 114 is provided, having a core 3 and coils 120 and 121, also shown in Figure 1. Likewise, the "tolerance" or auxiliary gauging heads 113 and 115 have cores 2 and 1, respectively, and coils 116 and 117 for head 113, and coils 118 and 119 for head 115. Reference plate 122 is provided in order to have a reference point in setting the distances for the respective gauges.

It should be understood that a standard differential at the distance of the standard can be obtained in other ways, too. One would be to mount exploring head 123, Figure 6, on an eccentric carriage 124, which causes the distance from the corresponding plate (T±X) to vary at each revolution by twice the amount of the eccentricity X. The alternating indication occurring at each revolution of the cylinder 124 on which or within which 4 is being mounted can be used to serve as basis for adjusting the sensitivity of the system always to give readings for equal deviation between standard (see Figure C) and the unknown (Figure 6).

My invention can be further understood by describing a typical operation of my device. First, gauge 114 is adjusted so that core 3 is at a distance T from the reference plate 122 which distance is equal to the standard thickness of the material to be measured, plus the distance between the lower edge of core 4 and the upper surface of the material 109 being measured as indicated in Figure 4. Core 2 is adjusted to a distance, $T-t$, which distance serves as a reference for controlling the minus tolerance. Likewise, the plus tolerance is set by adjusting core 1 to a distance, $T$ plus $t$, which serves as a reference for determining the plus tolerance. The gauging head 108 is placed on the material being gauged 109, say paper and if the thickness of the material being gauged is equal to the standard thickness, the signal obtained from series connection of the respective coils on core 3 and core 4 equals zero. Accordingly, tube 50 obtains zero input signal and the alternating voltage of this system will be zero.

However, if the material 109 is less than the standard thickness, then the input signal to tube 50 is going to be an alternating voltage in-phase with the input signal to tube 49 which will cause relay 107 to be energized which, in turn, can control a circuit for adjusting the thickness. Furthermore, the current across meter 99 will have a polarity and magnitude indicative of the amount of deviation from the standard. Likewise when the paper 109 is thicker than the standard thickness, tube 50 obtains a signal opposite in polarity to the signal of the tube 49 which will cause relay 97 to be energized. This relay may control the necessary controlling mechanism. Furthermore, the current across meter 99 will assume a direction opposite to the one when the paper was thinner than the standard.

The above description of the drawings and of the typical operation of my device are only illustrative of my invention and other modifications may be made within the scope of the following claims.

I claim:

1. A device for determining the thickness of materials by means of a standard gaging head and an exploring gaging head comprising in combination separate means to generate electrical signals depending on the distance between two portions of said gaging heads, said signals being connected in opposition so as to yield an output substantially dependent on the difference between the distances sensed by said two gaging heads, means to adjust said standard gaging head to a predetermined reference distance from a reference plate, means to influence said exploring gaging head by the thickness to be measured, a pair of auxiliary gaging heads mechanically linked with one of said gaging heads such as to vary their respective distances from said reference plate simultaneously with variations in said distance of said gaging head, means maintaining the difference between their distances at a predetermined constant value, the outputs of said two auxiliary gaging heads being also connected in opposition, means to simultaneously influence the sensitivity of all four of said gaging heads being also connected in opposition, means to simultaneously influence the sensitivity of all four of said gaging heads connected to said output of said pair of auxiliary gaging heads including means for maintaining said output of said pair of auxiliary gaging heads at a substantially constant level.

2. A device according to claim 1 in which the exploring gaging head is used as one of the two auxiliary gaging heads thereby serving a dual function.

3. A device according to claim 1 in which the standard gaging head is used as one of the auxiliary gaging heads thereby serving a dual function.

4. A device for determining the thickness of materials comprising a standard gaging head, an exploring head and reference plates, means maintaining said standard head a predetermined distance from one of said reference plates, means causing the distance between said exploring head and another of said reference plates to vary with the thickness of the material measured, the outputs of said heads connected in opposition so as to obtain a signal, the phase and magnitude of which is dependent on the direction and magnitude of deviation between the standard and unknown, means causing a known deviation around the distance of one of said heads from its respective reference plate and mechanically linked to said one of said heads, and automatic means for causing the output from said known deviation to render the aforementioned signal independent of the said predetermined distance of said standard head from its reference plate.

5. A device for determining the thickness of materials comprising a standard gaging head, an exploring head and reference plates, means maintaining said standard head a predetermined distance from one of said reference plates, means causing the distance between said exploring head and another of said reference plates to vary with the thickness of the material measured, the outputs of said heads connected in opposition so as to obtain a signal, the phase and magnitude of which is dependent on the direction and magnitude of deviation between the standard and unknown, means causing a constant periodical deviation of the distance of one of said heads from its respective reference plate and automatic means causing the periodical deviation of the obtained signal caused by said constant periodical deviations of the distance of one of said heads from its respective reference plate to stay substantially constant and causing thereby the sensitivity of the device toward variations of the thickness of the material measured to remain substantially constant.

References Cited in the file of this patent

UNITED STATES PATENTS

| Number | Name | Date |
|---|---|---|
| 1,889,361 | Hickock | Nov. 29, 1932 |
| 2,503,721 | Angell | Apr. 11, 1950 |
| 2,537,731 | Angell | Jan. 9, 1951 |